US008122867B2

(12) United States Patent
Fonville et al.

(10) Patent No.: US 8,122,867 B2
(45) Date of Patent: Feb. 28, 2012

(54) ENGINE WITH OIL PUMP MUFFLER AND NOISE DAMPER

(75) Inventors: Carl E. Fonville, Ann Arbor, MI (US); Michael R. Thelen, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 646 days.

(21) Appl. No.: 12/272,199

(22) Filed: Nov. 17, 2008

(65) Prior Publication Data

US 2010/0122870 A1 May 20, 2010

(51) Int. Cl.
*F02B 67/00* (2006.01)
*F02B 77/13* (2006.01)
*F16N 13/00* (2006.01)

(52) U.S. Cl. ........................ 123/198 C; 184/26; 181/204

(58) Field of Classification Search .............. 123/196 R, 123/198 C; 184/6.5, 26; 181/284, 294, 198, 181/205; 417/363

See application file for complete search history.

(56) References Cited

U.S. PATENT DOCUMENTS 4,591,319 A * 5/1986 Takahashi et al. ............ 417/360
5,692,883 A * 12/1997 Vourc'h ........................ 417/312
6,179,582 B1 1/2001 Matsunaga et al.
2004/0062664 A1 * 4/2004 Weigold et al. ............... 417/357

FOREIGN PATENT DOCUMENTS

EP 1074743 A2 * 2/2001

* cited by examiner

*Primary Examiner* — Noah Kamen

(74) *Attorney, Agent, or Firm* — Quinn Law Group, PLLC

(57) ABSTRACT

A wrap-around cover or noise muffler of oil and temperature resistant noise absorbing resilient elastomer covers the front and sides of a front mounted engine oil pump forming a pump and muffler assembly. The muffler absorbs vibrations and reduces the transfer of noise frequencies from the oil pump to an engine front cover that covers the pump. Additionally, the front of the muffler is shaped to fill the gap and engage the front cover in compression between the oil pump and the rear surface of the front cover, thereby damping vibrations of the front cover adjacent to the oil pump and to an accessory drive pulley that rotates ahead of the front cover for driving accessories.

11 Claims, 3 Drawing Sheets

ENGINE WITH OIL PUMP MUFFLER AND NOISE DAMPER

TECHNICAL FIELD

This invention relates to engines with front mounted oil pumps and to a muffler for absorbing noise from such oil pumps and for damping noise vibrations of an associated engine front cover.

BACKGROUND OF THE INVENTION

The present invention pertains to an engine having a cylinder block with a crankshaft driven oil pump mounted on the front of the block. The oil pump is enclosed within an engine front cover secured to the front of the block and also enclosing other components carried by the cylinder block. Operation of the oil pump in engine operation creates noise, which is radiated to the front cover and adds to the level of noise transmitted from the engine cover. A common method of noise reduction is to add external acoustical treatments to the cover. However, a more effective alternative solution is desired.

SUMMARY OF THE INVENTION

The present invention provides a novel wrap-around cover or noise muffler to cover the front and sides of a front mounted oil pump. The muffler absorbs noise vibrations and reduces the transfer of noise frequencies from the oil pump to an engine front cover that covers the pump. Additionally, the front of the muffler is shaped to fill the gap and engage the front cover in compression between the oil pump and the rear surface of the front cover, thereby damping vibrations of the front cover adjacent to the oil pump and the accessory drive pulley that rotates ahead of the front cover for driving a water pump and other accessories.

The scope of the invention also includes the oil pump and noise muffler assembly, which can be produced and shipped as a unit for engine installation. The engine, with the block mounted oil pump and engine front cover with the oil pump noise cover between them for noise absorption and damping noise vibrations in the cover is also within the inventive concepts.

These and other features and advantages of the invention will be more fully understood from the following description of a specific embodiment of the invention taken together with the accompanying drawings.

DESCRIPTION OF AN EXEMPLARY EMBODIMENT

Figure 1:
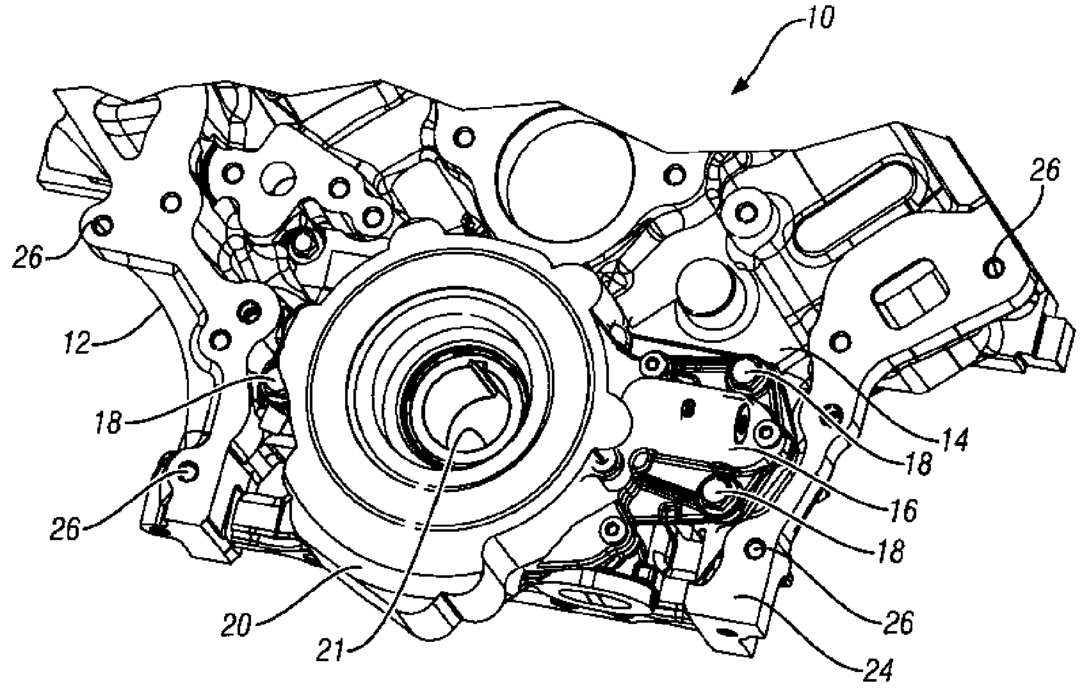
FIG. 1 is an isometric front view of a lower portion of an engine block having a crankshaft driven oil pump mounted on the front of the block.

Referring now to FIG. 1 of the drawings in detail, numeral 10 indicates an automotive engine block shown as an isometric front view of a pertinent lower portion 12 of the block 10 having a front wall 14. An engine oil pump 16 is mounted to the engine block front wall 14 by bolts 18 at laterally opposite ends of the pump 16. A muffler and noise damper 20 covers the front and sides of the pump 16 for noise reduction, as will be subsequently discussed. The oil pump 16 has a central opening 21 centered on a rotational longitudinal axis 22 (FIG. 5) of the crankshaft, not shown. The crankshaft axis 22 also locates a vertical plane, not shown, extending through the crankshaft axis 22 and referred to regarding FIGS. 4 and 5. The periphery 24 of the block front wall 16 includes mounting openings 26 for receiving bolts or studs for mounting of an engine front cover 28 (FIG. 2) on the front wall of the block 10 and an associated oil pan, not shown. The cover 28 and the block 10 with the oil pan enclose the oil pump 16, muffler 20 and other components, not shown, mounted on the block front wall 14.

Figure 2:
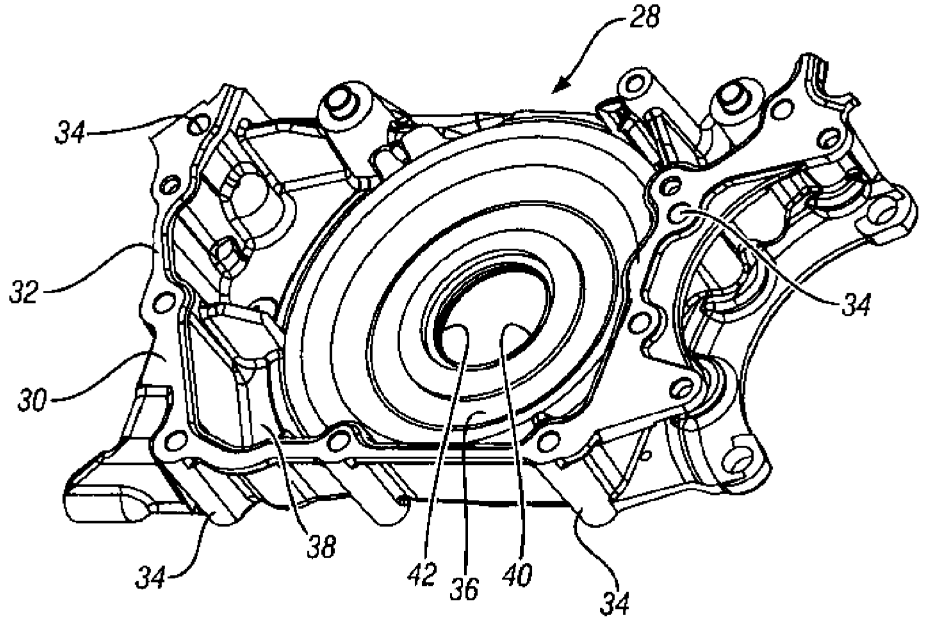
FIG. 2 is an isometric rear view of a lower portion of an engine front cover mountable on the block to enclose the oil pump and other components.

FIG. 2 is an isometric view of a lower portion of the rear side 30 of the engine front cover 28 corresponding to the lower portion 12 of the engine block 10. Peripheral portions 32 of the front cover 28 are provided with bosses 34 for receiving bolts or studs for mounting of the cover 28 on the front wall 14 of the engine block 10 and the oil pan, not shown. An annular recessed portion 36 of the cover front wall 38 has a central opening 40 mounting an oil seal 42 for sealingly engaging an end of the crankshaft, not shown. The crankshaft end, when installed, extends through the opening 40 for mounting an accessory drive pulley, not shown, close to the front wall 38 of the front cover 28. When the front cover 28 is mounted on the engine block 10, the block mounted oil pump 16 and muffler 20 extend into the recessed portion 36 of the engine cover front wall 38.

Figure 3:
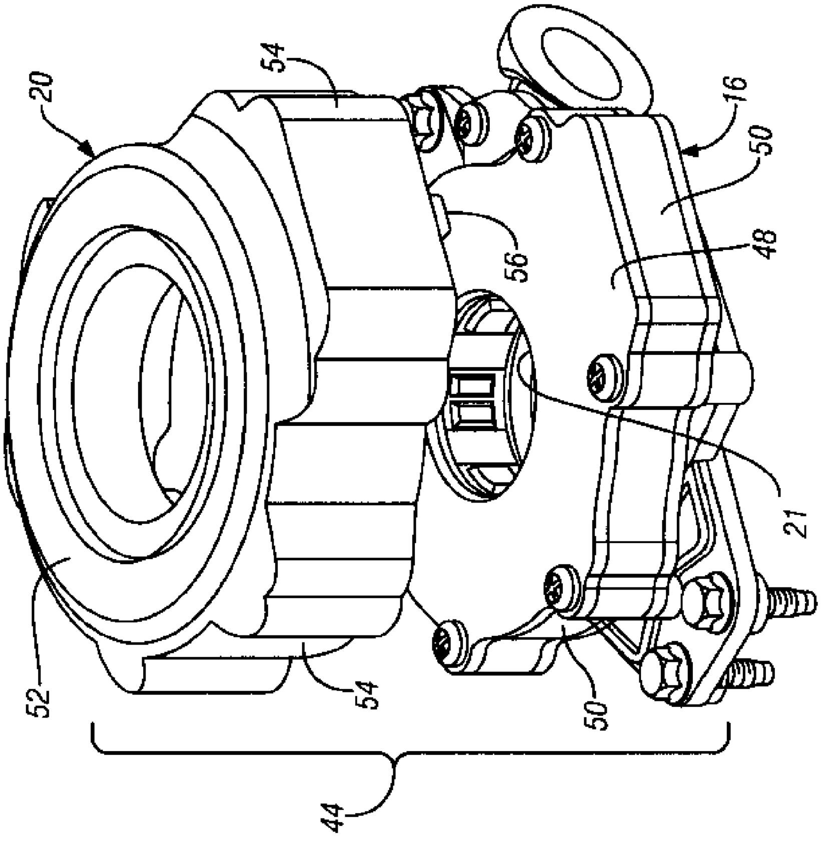
FIG. 3 is an isometric exploded view of an oil pump and muffler assembly for mounting on the block.

FIG. 3 is an isometric exploded view of an oil pump and muffler assembly 44 in accordance with the invention. Assembly 44 includes the oil pump 16 with the slip-on noise cover or muffler 20 fitted over the front 48 and peripheral sides 50 of the pump 16 as previously described. The muffler 20 is formed of a sound absorbing and resilient elastomer such as, but not limited to, AR-12 Polyacrylate. The muffler 20 includes a relatively thick front wall 52 that covers the front 48 of the oil pump 16. The muffler 20 also includes longitudinal peripheral sides 54 extending from the front wall 52 and closely surrounding the edges or peripheral sides 50 of the oil pump 16. If desired, the sides 54 of the muffler 20 may include lips 56 that slide over the pump sides 50 and act to retain the muffler 20 on the pump 16 as a complete assembly 44, ready for attachment to the engine block front wall 14.

Figure 4:
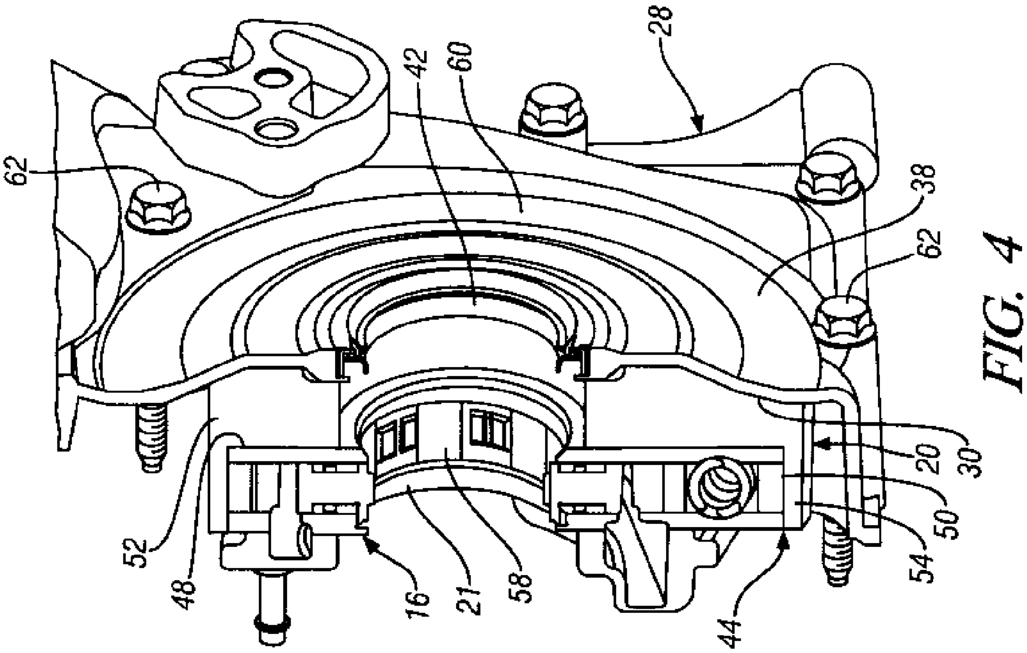
FIG. 4 is an isometric cross-sectional view from a vertical plane through the crankshaft axis and showing the left side portion of the engine front cover and the associated pump and muffler assembly looking from the front and right side of the assembly.

FIG. 4 is an isometric cross-sectional view from the vertical plane through the crankshaft axis 22 and showing the left side portion of the engine front cover 28 and the associated pump and muffler assembly 44 looking from the front and right side of the assembly. Visible in the drawing, starting from the back, are the oil pump 16, the muffler 20 enclosing the pump, and the engine front cover 28. Also shown are the central opening 21 and an inner rotor or gear 58 adapted to be driven by the crankshaft, not shown. The front 48 of the pump is engaged by the front wall 52 of the muffler 20 and the pump sides 50 are engaged by the sides 54 of the muffler to absorb noise vibrations or frequencies generated by the pump 16 and blocked by the muffler 20.

The thick front wall 52 of the muffler 20 is also designed to engage the adjacent rear side 30 of the cover front wall 38 in compression sufficient to damp vibrations of the engine front cover 28, which would otherwise result from noise frequencies carried to the front cover 28 from the pump 16 and other noise sources behind the cover 28. In this function, the muffler front wall 52 acts as a resilient damper, reducing vibrations of the front cover adjacent to the oil pump 16 and limiting the radiation of noise from the lower portion of the front cover 28.

Finally, FIG. 4 illustrates the outside surface 60 of the front cover which is configured to maintain a minimum clearance from the external accessory drive pulley, not shown, that rotates just forward of the front cover 28. Some of the cover attaching bolts 62 are also shown in FIG. 4.

Figure 5:
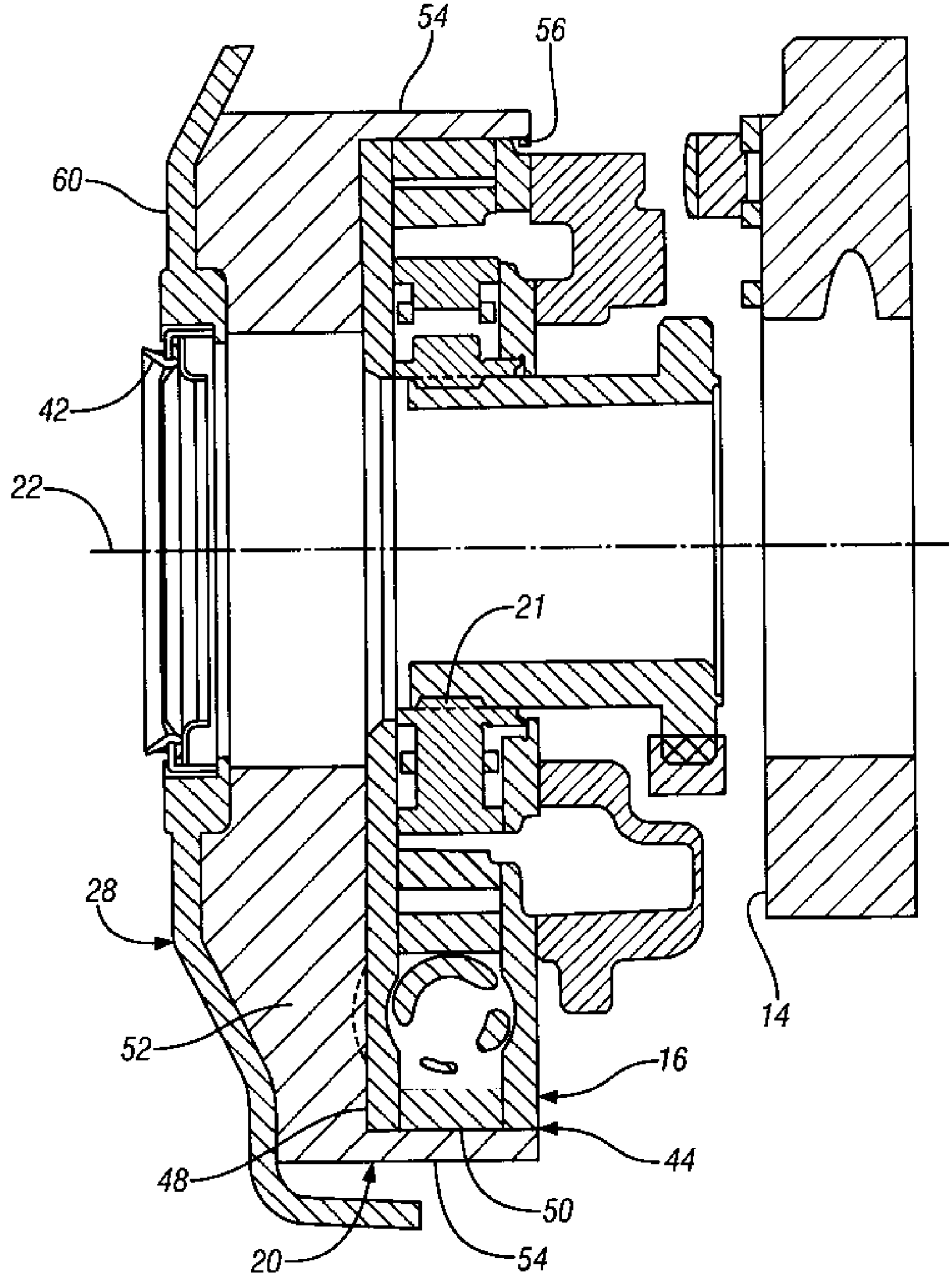
FIG. 5. is a cross-sectional view from a vertical plane through the crankshaft axis showing the right side of the engine front cover, oil pump and muffler assembly and the engine block front end mounting the pump.

FIG. 5. is a cross-sectional view from the vertical plane through the crankshaft axis 22 showing the lower right side of the engine front cover 28, the oil pump and muffler assembly 44, including the oil pump 16 and the noise muffler 20, and the engine block front wall 14 to which the oil pump 16 is mounted. The mounting features of the pump 16 are not shown in this view, as they are located at the lateral ends of the pump. Compressive engagement of the muffler front wall 52 with the engine front cover 28 is clearly shown, as are the front wall 52 and sides 54 of the muffler covering the front 48 and sides 50 of the pump. The cover oil seal 42 is also shown.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. An engine including an engine block having a crankshaft driven oil pump mounted on a front end of the block surrounding a crankshaft axis;

an engine front cover mounted on the block and having a recessed portion enclosing a front end of the oil pump; and an oil pump muffler including a front wall of noise frequency absorbing material extending across the front end of the oil pump between the front end of the pump and a rear side of the engine front cover, the muffler absorbing noise frequencies transmitted from the pump front end.

2. An engine as in claim 1 wherein the oil pump muffler includes peripheral sides of similar material extending rearward from the muffler front wall and absorbing noise frequencies from peripheral sides of the pump.

3. An engine as in claim 2 wherein the muffler comprises a slip-on cover extending over the front and sides of the pump.

4. An engine as in claim 3 wherein the front wall of the muffler is configured to resiliently engage both the front end of the pump and the rear side of the engine front cover to dampen vibrations in the engine front cover and reduce the emanation of noise vibrations from the adjacent portions of the engine front cover.

5. An engine as in claim 4 wherein the muffler includes retainer lips at selected locations of inner edges of the peripheral sides and engageable with sides of the oil pump to retain the muffler in place when installed on the oil pump.

6. A muffled oil pump assembly comprising:

a gear oil pump adapted to be mounted at an end of an engine block and drivable by a crankshaft extending through the pump, the pump having a generally flat front wall with longitudinally extending sides and a central opening adapted to receive a crankshaft for driving the pump; and a noise muffler including a front wall of resilient noise absorbing material mounted on the front wall of the pump and extending laterally to the sides, and longitudinal sides of the muffler extending from the front wall over the pump sides to inner edges thereof, the muffler forming a slip-on cover enclosing the front and sides of the pump in noise absorbing material for reducing the emanation of noise from the pump in operation.

7. A muffled pump assembly as in claim 6 wherein the front wall of resilient noise absorbing material is configured to engage an associated engine front cover in compression to dampen vibrations in the front cover adjacent to the installed muffled pump assembly.

8. A muffled pump assembly as in claim 6 wherein the material of the muffler is oil and temperature resistant.

9. An oil pump muffler comprising an integral member of resilient noise absorbing material, the member including a front wall having a generally flat interior for engaging an oil pump, and side walls extending laterally from the front wall of the muffler for covering sides of the oil pump; and wherein the front wall of the muffler includes a central opening for receiving an end of a crankshaft drivably connected to the pump.

10. An oil pump muffler as in claim 9 wherein the front wall of the muffler is relatively thick and configured to engage both the front wall of the oil pump and an opposing wall of an adjacent front cover to damp vibrations in the cover and reduce the emanation of noise frequencies from the front cover.

11. An oil pump muffler as in claim 9 wherein the noise absorbing material is an oil and temperature resistant elastomer.

* * * * *